United States Patent [19]

Fleming, Jr.

[11] Patent Number: 5,565,014
[45] Date of Patent: Oct. 15, 1996

[54] PROCESS OF MANUFACTURING A VITREOUS SILICA PRODUCT INCLUDING HYDROTHERMALLY DRYING A COLLORDAL SOL-GEL

[75] Inventor: James W. Fleming, Jr., Westfield, N.J.

[73] Assignee: Lucent Technologies Inc., Murray Hill, N.J.

[21] Appl. No.: 221,204

[22] Filed: Mar. 31, 1994

[51] Int. Cl.$^6$ ............................................... C03B 37/016
[52] U.S. Cl. ........................... 65/384; 423/338; 65/17.2; 65/395; 65/426; 65/412
[58] Field of Search .................... 65/395, 17.2, 426, 65/900, 412, 384; 423/338

[56] References Cited

U.S. PATENT DOCUMENTS

| | | | |
|---|---|---|---|
| 4,432,956 | 2/1984 | Zarzycki | 423/338 |
| 5,023,208 | 6/1991 | Pope | 501/12 |
| 5,076,980 | 12/1991 | Nogues | 423/338 |
| 5,240,488 | 8/1993 | Chandross et al. | 65/3.11 |

FOREIGN PATENT DOCUMENTS

| | | | |
|---|---|---|---|
| 409083 | 1/1991 | European Pat. Off. | 423/338 |
| 3137028 | 6/1991 | Japan | 65/17.2 |

OTHER PUBLICATIONS

George W. Scherer, *Theory of Drying*, J. Am. Ceram. Soc., vol. 73, No. 1, pp. 3–14 (1990).
Perry's Chemical Engineer's Handbook, Sixth Ed., pp. 20–3 through 20–14.

*Primary Examiner*—John M. Hoffmann
*Attorney, Agent, or Firm*—George S. Indig

[57] ABSTRACT

Sol-gel processing of a silica glass body is facilitated by rapid drying. The body, having been heated to a temperature of about 200° C. in a hermetically sealed vessel, is vented while reducing temperature. Termination of drying coincides with reduction to atmospheric pressure.

13 Claims, 2 Drawing Sheets

PROCESS OF MANUFACTURING A VITREOUS SILICA PRODUCT INCLUDING HYDROTHERMALLY DRYING A COLLORDAL SOL-GEL

BACKGROUND OF THE INVENTION

1. Technical Field

The invention is concerned with fabrication of products containing sol-gel-produced high-silica glass. Optical fiber and a wide variety of other products are contemplated.

2. Terminology

Terms of critical meaning to the disclosure are defined.

Sol—A dispersion of particles suspended in a suspension liquid—generally of silica-containing particles in water. Ethyl alcohol is a commonly used non-aqueous suspension liquid. (For these purposes, minor inclusions in the suspension medium, e.g. for modifying characteristics of the resulting gel, and for controlling the gelation process but not retained in the gel, are ignored.)

High-Silica Glass—Glass composed primarily of $SiO_2$. Minor ingredients do not ordinarily exceed a total of 5 wt %.

Admixed Sol—Sol prepared by mixing already-formed particles with suspension liquid. The gelled product is here referred to as an "admixed gel". (The conventionally used term, "colloidal", sometimes used in the literature to describe an "admixed gel" is avoided.)

Fumed Silica—Particulate $SiO_2$ prepared by flame hydrolysis of an appropriate silicon compound, e.g. of $SiCl_4$, generally using an oxyhydrogen torch. The sol used in the experimental work reported was an aqueous suspension of this form of admixed silica.

Precipitate Sol—As distinguished from an admixed silica sol, a precipitate sol is produced by liquid state reaction within the suspension liquid, for example, of a metalorganic precursor in water. The gelled product is sometimes known as a "polymer gel". The inventive teaching is not applied to precipitate sol.

Gel—A sol which has been gelled so as to be essentially non-fluid. Use of the term does not require total gelation, but only attainment of sufficient structural integrity for needed shape retention.

Overcladding—This refers to a tubular region which, as encompassing a core rod, forms the composite preform from which optical fiber is drawn. A type of overcladding in commercial use is a pore-free self-supporting tube. Alternatives include "direct overcladding", in which a still-porous tube is sintered in situ, to shrink and form a unitary body with the encompassed core rod.

3. Description of Related Art

Sol-gel manufacture of silica glass has held tantalizing promise for many years. Gelation of an aqueous suspension of silica particles is an economical approach to formation of this desirable glass. Silica glass, with its high melting point and, hence, high cost of preparation, has a variety of properties which are preferable to those of the commonly-used, more easily prepared, low-melting, mixed oxide glasses. As an example, silica glass was responsible for acceptance and commercialization of optical fiber. A suitable alternative has not been found.

Commercial optical fiber is generally produced by a vapor transport process—by Outside Vapor Deposition (OVD) or Vapor Axial Deposition (VAD), both using soot chemistry, or by Modified Chemical Vapor Deposition (MCVD)—all remarkable but expensive processes. Recognition that the functional part of the usual single mode fiber requires but 1–2% of the total cross section of the fiber, has led to a search for a less expensive process for fabrication of cladding to serve the physical requirements of the outer portion of the fiber. Overcladding tubes, made from sand or soot (from "natural" or "synthetic" quartz) have been introduced to serve this need.

Further cost saving is offered by the sol-gel process. In the economically preferred sol-gel process, a suspension of admixed silica particles and water (the sol) would be introduced into a mold and geller to directly yield the tube (the "near-net shape" body). The gel tube would then be dried and sintered, to produce a pore-free consolidated glass body. Melting and machining would not be necessary.

A significant breakthrough—that of U.S. Pat No. 5,240,488, issued Aug. 31, 1993—overcame the yield-reducing cracking problem, which had prevented industry acceptance. Sol-gel-produced silica glass overcladding is now used in fiber fabrication. The patented process depends on use of a small amount of a transient polymer additive which, after serving to minimize cracking during gel drying, volatilizes during sintering, to leave the desired polymer-free silica product. Free-standing sol-gel tubing made by this process is a promising candidate for general replacement of overcladding now used commercially. The process is under study, also, for manufacture of a broad variety of "near-net shape" non-fiber products.

Drying is a costly pan of the sol-gel process. Fabrication of free-standing overclad tubing, for example, depends on slow room-temperature, high relative humidity, air-drying to avoid cracking due to local variations in moisture content in the tubing. Drying periods of a week or more are now prescribed for kilogram-size bodies. Used in fiber production, shape retention of the delicate wet gel overcladding tube, has required supporting rods which are continually rotated, at least, during the initial drying period. The three-point loading strength of the wet gel, as removed from the mold, has a modulus of rupture (MOR) of 0.01–0.05 MPa (mega pascals)—a very low strength, requiring a high degree of care in handling.

The nature of the problem is well understood. George W. Scherer in J. Am. Ceram. Soc., vol. 73, No. 1, pp. 3–14 (1990), in Theory of Drying, presents an excellent review. In short, shrinkage has been inseparable from gel drying—in the first or Constant Rate Period of drying (CRP), the tensile forces exerted by the migrating water are sufficient to significantly shrink the pores, and keep them filled ("saturated"). Since uncontrolled surface evaporation is generally more rapid than migration, there is greater pore-shrinkage near the surface. Resulting differential pore shrinkage—greater shrinkage in the surface direction—maintains hydrostatic head during this period. CRP is followed by first and second Falling Rate Periods (FRP1 and FRP2). FRP2 begins as the evaporation front begins to penetrate into the body. During this period, shrinkage results from combined effects—the drying layer expands as tensile forces are relieved, and the inner saturated portion of the body contracts to keep the inner pores filled.

Drying-induced differential shrinkage is the major cause of cracking. To control cracking it has been necessary to slow down the liquid migration rate. To accomplish this, evaporation removal has been slowed by room-temperature drying in humid air—in air maintained at above 60% rel. hum. commonly above 80% rel. hum.

SUMMARY OF THE INVENTION

"Hydrothermal Drying" provides for rapid drying of a wet-gel body at elevated temperature and pressure. Prior processing uses the "hydrothermal-strengthening" procedure of co-filed U.S. patent application Ser. No. 08/221114, which entails heating a gelling aqueous sol to temperatures well above the 1-atmosphere boiling point of water in an autoclave which is hermetically sealed to withstand pressure build-up. The inventive "hydrothermal drying" entails venting while still at high pressure. Resulting drying times are typically of the order of hours for bodies that required days in conventional processing.

The co-filed application strengthens the gel sufficiently to result in "zero-shrinkage" during accelerated drying. By that method, usual 10–12% linear shrinkage, experienced in traditional processing, is reduced to 1% or less, which permits significantly shortened drying times.

It is the present finding that hydrothermal strengthening is sufficient to permit a qualitative departure from familiar gel-drying practice. It is now found that the gel has been strengthened sufficiently to withstand rapid drying by use of differential pressures, as high as 200 psi.

The present finding is applicable to many forms of gel processing. Experimental study has, however, been limited to use of aqueous, admixed sols, and this is likely to be the primary area of commercial value. The inventive process is usefully applied to the modified sol of U.S. Pat. 5,240,488, issued Aug. 31, 1993. It has been successfully used with gels produced from sols containing neither of the (polymer nor glycerin) additives of that patent. The present process may ultimately supplant that patented process.

Effort leading to the present invention was directed to optical fiber production. Its use in fiber drawing will likely be widely practiced. More generally, the invention is a further advance, facilitating "near-net shape" molding of silica glass, without need for heating to high "melting" temperatures. It will likely be applied to a wide range of products.

DETAILED DESCRIPTION

I. General

Figure 1:
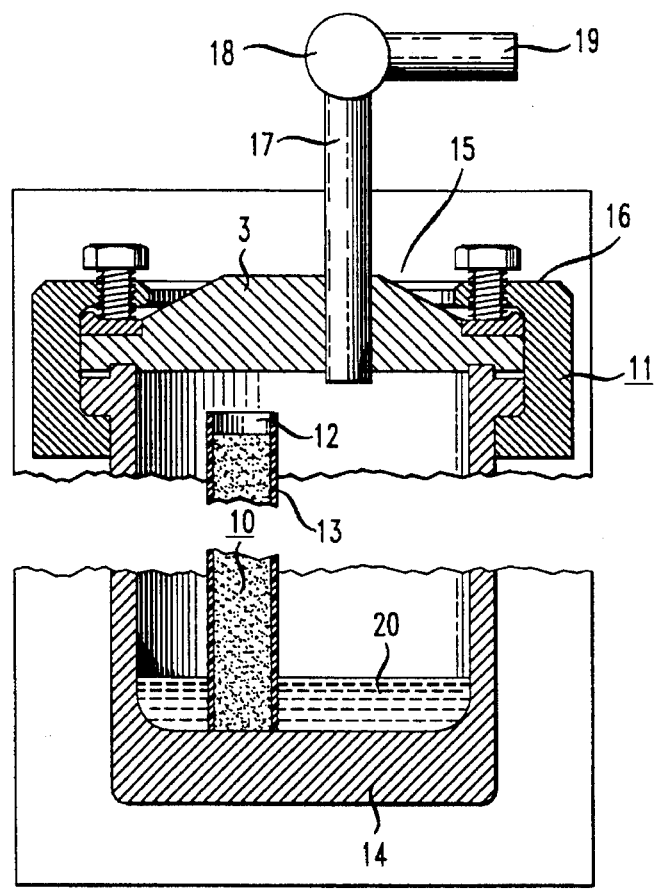
FIG. 1 is a sectional view of the apparatus used in developing the data of the examples and following figures.

Co-filed U.S. patent application Ser. No. 08/221114, teaches hydrothermal treatment for avoidance of drying shrinkage. Attainment of the "zero-shrinkage" state transforms drying and other subsequent processing. For purposes described, the still-wet gel body may truly be regarded as a "rigid body". These processing steps are facilitated due to strengthening or larger retained pore size, both implicit in "zero-shrinkage". The greater value is in drying in which is no longer necessary to maintain ambient at very high relative humidity to avoid cracking. The controlling flux rate of water within the pores may be increased by heating.

Hydrothermal drying is based on the realization that the strengthening step has gone far beyond reducing fragility. The body may now be subjected to drive forces in order of magnitude greater than those for rate variation in conventional practice. Initial venting, invariably at a temperature of at least 150° C., expels vapor under a pressure differential at least an order of magnitude greater than that conventionally practiced. Conventional drying—room temperature drying in air at a relative humidity of 80%—is initially driven by a force proportional to the difference between ambient partial pressure and surface vapor pressure. Vapor pressure is initially increased to several atmospheres—225 psi at 200° C. This is a factor of 15 (without considering the now-permitted reduction in relative humidity). Following the evaporation-control initial constant rate drying period (CRP), the limiting flux rate (for liquid phase water) is increased by temperature-dependent flux rate.

II. The Sol-gel Process

The inventive advantage is expected to play a role in a large variety of processes. In certain of these, sol-gel processing is now used, and application of the invention may simply take the form of inclusion or substitution of the hydrothermal treatment step. In some, sol-gel processing, now including hydrothermal drying, is expected to replace other forms of processing.

Sol-gel processing, itself, is a well-developed art. Process steps prior to or subsequent to hydrothermal processing are well-known, and are not discussed in detail. The TABLE of U.S. Pat. No. 5,240,488 is set forth in its entirety. It lists processing steps and conditions practiced in state-of-the art sol-gel processing.

TABLE

| PROCESSING STEP | RANGE | | CONSEQUENCES | |
| --- | --- | --- | --- | --- |
| | Preferred | Broad | Too Low | Too High |
| 1. Mix silica + water | | | | |
| a) silica (m²/g surface area) | 30–60 | 20–100 | settles out | pores too small, viscosity too high |
| b) wt % SiO$_2$ | 40–50 | 30–60 | excessive shrinkage and cracking | excessive viscosity, pore entrapment rapid gelation |
| c) temperature (°C.) | 20–40 | 0–100 | freeze poor dispersion | boil, excessive evaporation |

TABLE-continued

| PROCESSING STEP | RANGE | | CONSEQUENCES | |
|---|---|---|---|---|
| | Preferred | Broad | Too Low | Too High |
| 2. Mix TMAH | | | | |
| a) wt % based on $SiO_2$ | 1.6–3.2 | 1–6 | slow gelation, soft gels | rapid gelation, brittle gels non-transparent glass |
| b) mixing time (min) | 3–9 | 1–30 | poor mixing | contamination, sol heats up |
| 3. Mix polyethyloxazoline | | | | |
| a) wt % based on $SiO_2$ | 0.1–0.6 | 0.05–1 | tendency to crack | non-transparent glass |
| 4. Mix glycerin | | | | |
| a) wt % based on $SiO_2$ | 0.5–2 | 0–10– | tendency to crack | gel too soft |
| 5. Aging | | | | |
| a) aging time (hr) | 1–20 | 0.5–200 | poor gelation | brittle or cracked gel |
| b) aging temperature (°C.) | 20–30 | 10–60 | inconvenient, slow | brittle or cracked gel |
| 6. Add gelation agent (equivalents*/TMAH) | 1.2–1.4 | 0.5–2 | too soft | brittle or cracked gel |
| 7. Pour into mold, deaerate | N/A | N/A | N/A | N/A |
| 8. Gel aging (hr) | 1–24 | 0.25–100 | soft, weak gel | brittle or cracked gel |
| 9. Extraction of gelled body | N/A | N/A | N/A | N/A |
| 10. Gel Drying on Rollers | | | | |
| a) Temp (°C.) | 10–30 | 0–80 | too slow | weak dried body, cracked gel |
| b) RH (%) | 75–95 | 30–99 | cracking, weak dried body | too slow |
| c) Rotation (rpm) | 0.1–1 | 0.01–10 | deformation | exfoliation of surface |
| 11. Removal of Volatiles (including organic materials) | | | | |
| a) Temperature (°C.) | 120–300 | 100–500 | Cracks when heated | unnecessary, interferes with dehydroxylation |
| b) Heating rate (°/hr) | 3–10 | 1–50 | slows process | cracking |
| c) Atmosphere (% $O_2$) | 20 | 5–100 | carbon residue | ignition of organics |
| 12. Dehydroxylation | | | | |
| a) Temperature (°C.) | 500–1000 | 300–1100 | OH and metals remain | traps $Cl_2$, $O_2$ and impurities |
| b) Time (hr) | 1–5 | 0.1–20 | OH and metals remain | expensive, no added value |
| c) Atmosphere | | | | |
| 1. $Cl_2$ (%) | 3–6 | 1–100 | OH and metals remain | excessive incorporation in glass |
| 2. $O_2$ (%) | 0–10 | 0–90 | residual carbon | OH and other impurities remain |
| d) Heating rate (°C./hr) | 100–200 | 50–500 | slow process | furnace damage, cracking |
| 13. Sintering (30 cm hot zone) (He atmosphere) | | | | |
| a) Temperature (°C.) | 1300–1500 | 1200–1750 | incomplete densification | excessive deformation, expensive |
| b) Pull rate (cm/hr) | 15–100 | 5–200 | process slow, excessive deformation | cracking, incomplete densification |

Table Notes:
Where temperature range is not specified, room tempersture (e.g., 15–30° C.) is used.
*Number of compensating units, i.e., number of hydrogen-yielding units in the pH-lowering compound as divided by the number of Oh-yielding units in the pH-increasing compound (i.e., in the TMAH).

The following discussion addresses permitted alternatives to the numbered steps in the TABLE, when using hydrothermal drying. While more generally applicable, conditions are for the demanding instance of fiber fabrication. General comments are not reproduced from that patent and are incorporated by reference.

1. This step describes the initial admixed sol. Hydrothermal treatment is a factor in permitting use of the higher silica concentrations within the prescribed limits.

A cause of reduced fiber yield has been alleviated by mechanical and/or chemical removal of $ZrO_2$ and other refractories. See U.S. patent application Ser. No. 08/029753, and U.S. patent application Ser. No. 08/029750, both filed Mar. 11, 1993. Centrifuging is usefully introduced at this stage for mechanical removal.

2. Briefly, TMAH introduced in this step, serves as "dispersant". The amount is sufficient to bring pH within the range of 11–14. Suitable alternatives include higher homologs of TMAH. As in the patent from which the TABLE is taken, reference to TMAH, the dispersant of choice at this time, is not intended to be limiting. The range of inclusion is sufficient to induce like ionic charges on the particles, to assure repulsion and to avoid agglomeration. Specific discussion assumes usual sol alkalinity. The same considerations apply to operation in the corresponding acidic pH range.

3. Hydrothermal treatment lessens importance of polymer, and may make it unnecessary.

With elimination of drying-induced differential shrinkage, "tendency to crack" is not a likely consequence of exceeding the stated range. While there is no cracking danger in use of greater amounts of polymer, there is little advantage. Use of lesser amounts—elimination altogether—is viable.

4. Use of glycerin continues to be a safeguard, but is of reduced importance. It too, may be eliminated.

5. The aging of this step is generally unaffected by the invention.

6. Unaffected—Here, as elsewhere in the description, gelation is the result of decreasing pH. Examples of suitable gelation ingredients are methyl formate and its higher homologs. Gelation may be induced by increasing pH of acid sols.

7. No change.

8–11. In work described in the examples, the filled mold was next strengthened by hydrothermal treatment (see synopsis under III), following which it was hydrothermally-dried (see section IV).

12. Detailed processing conditions during dehydroxylation and sintering have not been optimized. Conditions used in traditional processing are conservative. Dehydroxylation and other gas treatment are facilitated by larger retained pore size.

13. No change.

III. Hydrothermal Processing

The terminology "hydrothermal processing", as used in this description, refers to the processing of the co-filed application. As applied to aqueous silica sol, it requires heating to a specified temperature threshold—one which assures a favorable "trade-off" between strengthening and embrittlement. In terms of single-cycle processing, the required threshold is at 195° C.—of course, attained throughout the specimen.

1) Hydrothermal processing may be initiated prior to or at various stages of gelation. To avoid entrapment of the mandrel portion of an annular mold or of any other separable re-entrant mold part, gelation is first allowed to proceed to an extent necessary to permit its removal.

2) Water, necessary to avoid premature drying, is added and the container is hermetically sealed. The container may be the mold itself, or an outer autoclave.

3) Container and contents are heated to required attained temperature. In preferred single-cycle treatment, attained temperature is necessarily at least 195° C. with preference for higher temperatures to 230° C. and higher. Where a lower attained temperature is desirable, use may be made of multi-cycle treatment. Dual cycling, for realization of "zero-shrinkage", requires a temperature of at least 175° C.

Rate-of-rise is of small consequence. For assured temperature-dependent strengthening, heating and hold conditions should be adequate to assure reasonable temperature homogenization.

IV. Hydrothermal Drying

The inventive drying procedure has been introduced without cooling from temperature attained (maximum temperature) in hydrothermal processing. It has been initiated upon attainment of maximum temperature without longer holding time than required for thermal homogenization. In one experiment, the hermetic seal broke so that venting proceeded uncontrollably from attained temperature (attaining atmospheric pressure in 5 minutes). The body did not crack.

Processing conditions will be more moderate in practice. It is clear that removal of differential shrinkage de-emphasizes the significance of temperature gradients and permits rapid cooling. However, the mechanism of "Ostwald Ripening" discussed in Section V cannot be totally discounted. Conditions favoring this mechanism may further strengthen the gel body (beyond levels implicit in the "zero-shrinkage" state). Processing may entail: deliberate extension of the holding period; cooling over some limited range before venting; limiting cooling rate, at least to some specified still-elevated temperature; and heating during drying. Prescription of conservative thermal conditions may simply reflect good engineering practice.

Figure 2:
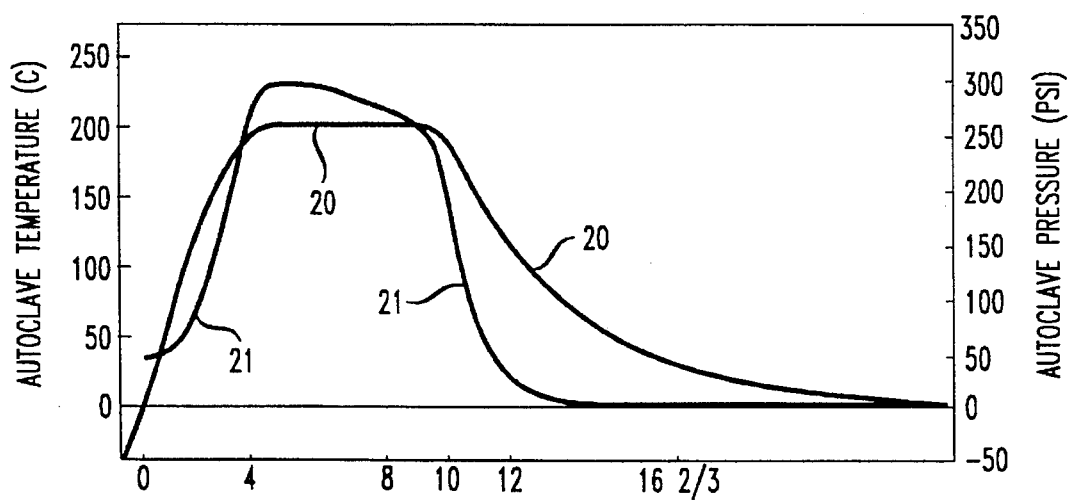
FIGS. 2 is a plot relating time alternately to temperature and pressure for an embodiment in which venting (hydrothermal drying) is begun at maximum temperature attained during strengthening.
Figure 3:
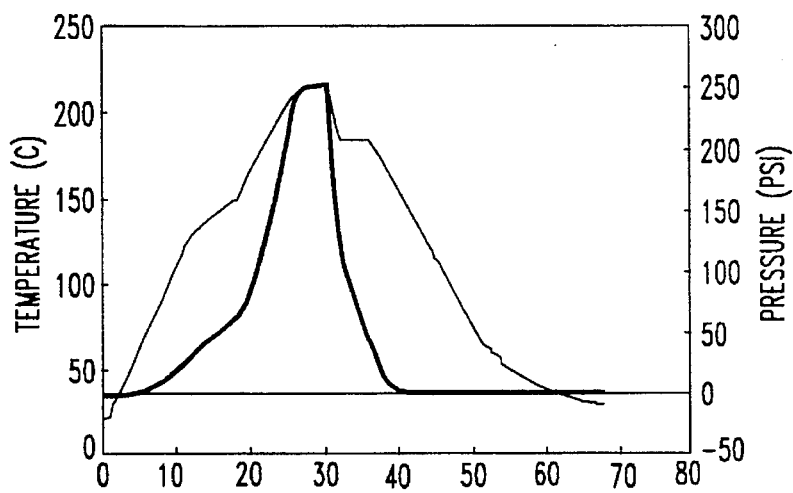
FIG. 3, on the same coordinates, reports data for an embodiment in which the body is permitted to partially cool before venting.
Figure 4:
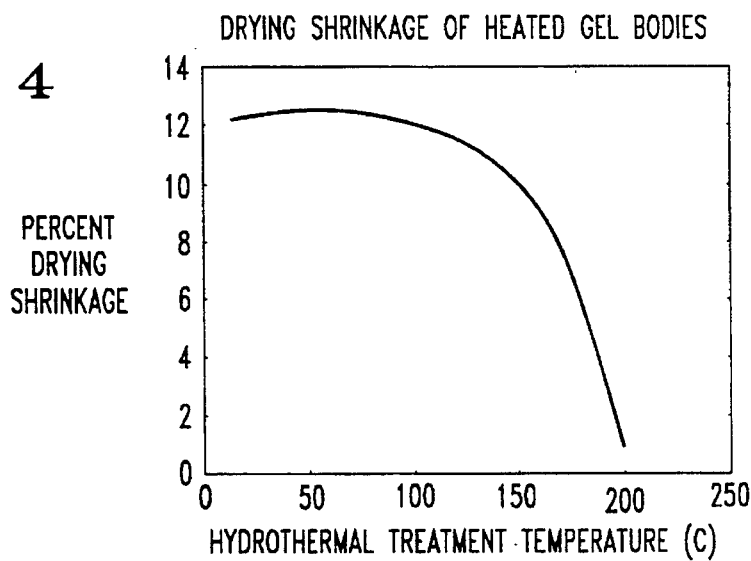
FIG. 4 is a plot relating percent shrinkage during drying to attained temperature during hydrothermal treatment.

The Hydrothermal Drying step begins with initiation of venting. The form of the date on FIGS. 2–4 is for a hydrothermal drying period of at least 1 hour. The step is considered complete when atmospheric pressure is reached. Most experimentation has used a period of 4 hours or more. With specimens of 1 kg or larger this has invoked initial venting at 10 to 20 cc/min. At this venting rate, it has been possible to heat sufficiently to maintain temperature constant during the entire drying period.

Following heating necessary for "zero shrinkage" the autoclave may be cooled. Hydrothermal drying is effectively carried out from an initial temperature of at least 150° C., although there appears to be little advantage in cooling to temperatures below about 180° C. before venting. The purpose of cooling, prior to drying, is to take advantage of Ostwald Ripening. Effective drying—always from a temperature of at least 150° C.—should not require more than about 10 hours for the exemplary one or few-kilogram body.

Distributed venting is some further assurance of drying uniformity, and may be desired, at least for larger bodies.

The drying phenomenon has been studied. The classical postulated mechanism is plausible, although the relative contribution of the various phases is altered by the phenomena of hydrothermal treatment and hydrothermal drying. Perry's Chemical Engineers' Handbook, Sixth Ed. at pp. 20–3 through 20–14 describes drying as consisting of three consecutive phases. The first—the Constant Rate Period (CRP)—was a significant contributor in conventional gel processing, in which pore-shrinkage accommodated water removal to maintain the needed hydrostatic head for the usual 10–12% linear shrinkage period. It is now foreshortened. Most drying is now accomplished during the two Falling Rate Periods (FRP1 and FRP2). (FRP2 is described as the falling rate period in which "funicular" water path becomes "pendular"—so that the evaporating front penetrates into the body.) Drying during both FRP1 and FRP2 is controlled by migration rate (or "flux" rate) for liquid-phase water. The limiting flux rate is temperature—dependent—each of the determining characteristics of viscosity and permeability is exponentially dependent.

Recent activities in sol-gel processing have sought to overcome fragility. In a very real sense, that effort has culminated in the advances of this and the co-pending application. Drying may now ignore cracking and be truly rate-limited. Hydrothermal drying substantially increases rate. A preferred embodiment uses heating during drying. This lessens fall-off in rate (and may enhance Ostwald Ripening). For slow venting, evaporative cooling is lessened and it has been feasible to maintain temperature during the entire drying cycle. It may even be possible to increase temperature, and to reduce or even offset the decreased drying rate during some of the FRP1 or FRP2 phases.

Maximum cost and time advantage are realized by initiating hydrothermal drying immediately after hydrothermal treatment (subject to minor variations, e.g. to favor Ostwald Ripening). It is implicit in the teaching that hydrothermal drying may be carried out from elevated temperature whether or not associated with the prior hydrothermal treatment. It may have been hydrothermally treated with subsequent cooling and reheating to the minimum temperature of 150° C. Other variations are apparent. There may be special circumstances for practicing any such variant.

For purposes of this description, the body is considered "dried" upon removal of water sufficient to permit initiation of the subsequent processing step. For many purposes, removal of as little as 50% by weight of initially-contained water is adequate. The various types of gas treatment—dehydroxylation, refractory particle removal—are now practiced at such moisture levels. Removal of substantially all contained water upon consolidation—particularly for more demanding optical purposes, as in optical fiber fabrication—is still required.

While it remains true that subsequent processing may remove residual water to the required level, hydrothermal drying, under conditions practiced in the Examples, has been found to result in removal of water to a level required for consolidation.

V. Mechanism

The advance sheds new understanding on gelation, and has implications beyond that of the claims. Contributions to strengthening take two complementary forms:

A. The more significant mechanism is bond strengthening. Initial hydrogen bonds (Si—O—H—H—O—Si) are convened into siloxane bonds (Si—O—Si). In traditional processing, this strengthening has largely awaited drying. Hydrothermal treatment accelerates bond conversion to produce a strong still-wet body. There is the possibility that "new" siloxane bonds are formed (where hydrogen bonds did not already exist). Resulting siloxane bonds, under prescribed invention conditions, are, in any event, sufficient for attaining the desired balance between strengthening and embrittlement.

B. Description of gelation conventionally invokes "Ostwald Ripening". In accordance with this phenomenon, the strength of the particle-to-particle bonds is increased by the precipitation of siloxane bonded silica at neck-down regions. This redeposition, like bond conversion, is energetically driven. This process, too, is accelerated for the temperatures and pressures attained in hydrothermal processing. Increased silica solubility, increases the rate of dissolution-redeposition. The process is understood—smaller (high-free energy) particles are preferentially dissolved, and redeposit at positions of smallest negative radius. The net result is free energy decrease. Ostwald Ripening is accelerated at hydrothermal treatment temperatures.

A variety of conditions used in hydrothermal drying may have implications for Ostwald Ripening. Use of a holding time beyond that required for thermal homogenization may advance the energy-reducing process. Dropping temperature, prior to venting, with its decreasing silica solubility, may hasten the mechanism (as in specific embodiments described in the co-filed patent application). Venting—during the hydrothermal drying mechanism itself—in principle, has an effect equivalent to dropping temperature. Removal of solvent, even at constant temperature, hastens redeposition. Controlled venting may cause the process to more closely approach energy equilibrium.

There is empirical proof that the low-energy condition, which drives Ostwald Ripening is not awaited under practical conditions—under prolonged holding or with repeated cycling. There is no danger of losing porosity and producing the single, pore-free spherical silica body which corresponds with lowest energy.

VI. Optical Fiber

Although advantages gained through hydrothermal drying are applicable to a broad range of products, it will, likely, have its first significant impact in the fabrication of optical fiber. U.S. Pat. No. 5,240,488 emphasizes an expected role for sol-gel in fiber fabrication, and reliance is had on that patent for detailed discussion.

It describes fiber drawing from a composite preform produced from a core rod within an overcladding tube. The rod is made by use of a conventional vapor transport process such as Modified Chemical Vapor Deposition (MCVD), or a "soot" process such as Vapor Axial Deposition (VAD) or Outside Vapor Deposition (OVD). The overcladding tube is free-standing—produced by consolidation of a dried gel body. Direct overcladding—consolidation about the already-encompassed core-rod—is also visualized.

There is a specific advantage of particular consequence in fiber fabrication. In fabrication of the composite preform, any substantial warpage of the overcladding tube interferes with close spacing to the core rod. Avoidance of warpage has required very slow drying. The particular advantage of the inventive procedure is clear from George Scherer's writings (see "Theory of Drying", cited above). In the last column of p. 8, in describing FRP2, he describes the mechanism for the observed warpage. It invokes drying-induced differential shrinkage, which the present invention avoids. He ascribes convex warpage (as viewed from the drying surface) to contraction of the inner saturated region relative to the drying surface region.

A specific embodiment contemplates fiber fabrication from a composite preform using a free-standing consolidated overcladding tube.

VII. Figures

FIG. 1 is a cross-sectional view of the apparatus used in the Examples. It consists of a mold 10 contained within an autoclave 11. Mold 10 depicts a gelling body 12 enclosed within tubular wall 13. The outer receptacle or autoclave consists of an enclosing section 14, top 15 and ceiling member 16. Provision for venting consists of penetrating tube 17, valve 18 and exhaust tube 19. As shown, excess water 20 is provided to prevent premature drying. For the apparatus shown, 1000 cc of water was required to assure continued saturation of the bodies prior to venting. Drying time was approximately 10 hours (with drying time defined as having been initiated with venting and terminated upon pressure release). It is estimated that 80% of the water content had been removed after 6 hours (corresponding with the knee of the pressure curve).

FIGS. 2 on coordinates of time on the abscissa, and alternative alternate values of pressure and temperature contains curves 20 and 21 tracing temperature and pressure overtime for the conditions of Example 1. That example was conducted under preferred conditions in which drying immediately succeeded hydrothermal treatment. Treatment was begun at times zero with heating to attained temperature of 200° C. requiring about 4 hours. Developed pressure was about 300 psi at this temperature. Venting was initiated immediately upon temperature attainment (with equilibration of about 20 min.). The autoclave was maintained at temperature by heating over substantially the entire drying period. Excess water was sufficient to maintain pressure essentially constant about 1–½ hours (to curve position 22) after which it dropped. At 23, pressure was reduced to about 260 psi, this pressure signaling a steep drop in temperature, at which time the body was essentially dried. Thereafter, rapid drop in pressure, with atmospheric pressure having been reached after about 13 hours (corresponding with a temperature of about 100° C.).

The same curve forms are representative of Example 2 in which the specimen was held at temperature for a period of 2 hours before venting. The data developed in this example results in a small shift toward extended time. In other experiments, vent rate was varied, with no substantial change in curve form.

FIG. 3 is a plot on the same coordinates as in FIG. 2, in this instance, for Example 3—in which the specimen was partially cooled (from attained temperature of 220° C. down to 180° C.) before venting. For the larger body of this Example (2.5 kg), hydrothermal drying required approximately 8 hours (on the same—basis terminating at attainment of atmospheric pressure). 80% of water had been removed after about 4 hours.

Figure 5:
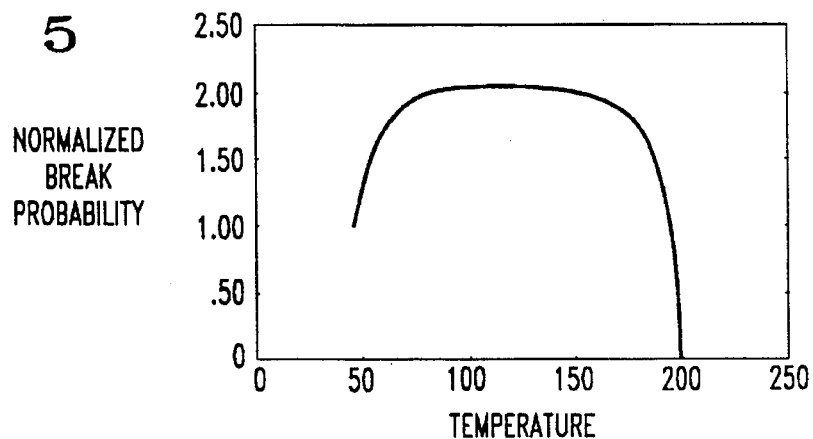
FIG. 5 is a plot relating break probability to attained temperature for optical fiber drawn from a composite preform using a free-standing consolidated overcladding tube made by the sol-gel process of the invention.

FIGS. 4,5 are identical to FIGS. 4 and 5 in the co-filed patent application. They are based on temperature-related data which continues to describe the hydrothermally dried product. Properties are percent drying shrinkage (FIG. 4) and fiber break probability (FIG. 5). Strengthening in hydrothermal treatment is sufficient to withstand hydrothermal drying without impairment of the product.

FIGS. 4 and 5 present different aspects of the same phenomenon. Both support prescription of a minimum hydrothermal treatment—attained temperature of 195° C. (for single-cycle processing). Data points substantially below 195° C. on the figures are not meaningful for process design. They are meaningful in a more general sense. The sharp increase in break probability for lower temperatures shows the balance between strengthening and embrittlement—at these temperatures, bond strengthening is insufficient to withstand frozen-in strain so that embrittlement predominates (to make hydrothermal treatment disadvantageous).

A third plot is not reproduced from the co-filed application. It shows temperature dependence of strength (modulus of rupture determined by 3-point loading). The same strengthening is developed and makes hydrothermal drying possible. The strengthening is not of independent consequence.

VIII. Examples

Example 1—This Example is based on the same experiment as that plotted in FIG. 2. Six gel bodies, all rod-shaped and of the same dimensions: 25 mm diam. and 200 mm length were produced. Samples were prepared from the same ingredients and the same relative amounts as those used in Example 6 of U.S. Pat. No. 5,240,488. Unless otherwise stated, all processing conditions were those of that same patent Example. Briefly, ingredients were 94.7 wt. % aqueous admixed silica sol (42 wt. % solids); 4.6 wt. % aqueous tetramethylammoniumhydroxide CYMAH); 0.1 wt. % polyethyloxazoline in water; 0.6 wt. % glycerin.

Specimens were placed in the autoclave shown schematically in FIG. 1 and heated according to the schedule described in the detailed description of FIG. 2. After cooling, the specimens were removed from the autoclave. They were substantially dry as removed, and showed no evidence of cracking.

Example 2—Six samples of the same size and composition as indicated in Example 1 were placed in the autoclave and heated according to the second schedule described in the detailed description for FIG. 2. Upon removal the substantially dry samples showed no evidence of cracking.

Example 3—Specimens of the same composition as Examples 1 and 2 but molded to a tubular shape of 9 cm od. and 2 cm id. by 40 cm length were placed in an apparatus schematically described in FIG. 1 and treated according to the schedule described in the detailed description for FIG. 3. Upon cooling to room temperature, the dry, uncracked specimen was removed from the autoclave unbroken.

What is claimed is:

1. Process for fabricating an article, at least in part composed of high silica glass, the process including fabricating a high-silica glass body from a sol consisting primarily of silica particles in water, the process comprising the process steps of gelling the said sol to result in a wet gel body, drying the wet gel body so as to substantially remove the water, thereby producing a dried gel body, firing the dried gel body to produce a consolidated high-silica glass body, wherein the improvement comprises heating the wet gel body to attained temperature in excess of the 1-atmosphere boiling point of water, while in a hermetically sealed container so as to maintain developed pressure, and wherein the drying step comprises hydrothermally drying by venting, with the venting initiated at a temperature of at least 150° C. and is completed upon attainment of atmospheric pressure, the period from commencement of venting to attainment of atmospheric pressure defining the period of hydrothermal drying, and wherein the attained temperature of the wet gel body is sufficient to result in the "zero-shrinkage" state, defined as degree of shrinking upon drying during the drying step which does not exceed one percent in any linear dimension of the wet gel body.

2. Process of claim 1 in which the sol includes dispersant, and in which the gel body is substantially dry upon attainment of atmospheric pressure.

3. Process of claim 2 in which the hydrothermal treatment consists essentially of single-cycle heating, and in which the attained temperature is at least 195° C.

4. Process of claim 3 in which the venting is initiated with the body at the attained temperature.

5. Process of claim 4 in which the attained temperature of the body is maintained for a period in excess of that required for thermal homogenization of the container and the body prior to the venting.

6. Process of claim 3 in which the temperature of the body reduces from attained temperature prior to the venting.

7. Process of claim 6 in which the venting is commenced with the body at a temperature of at least 180° C.

8. Method of claim 7 in which the body is a free-standing, consolidated tube.

9. Process of claim 3 in which the period of hydrothermal drying is at least one hour.

10. Process of claim 9 in which the period of hydrothermal drying is a maximum of 10 hours.

11. Method of claim 3 in which the gel body is heated during the hydrothermal drying.

12. Method of claim 11 in which the temperature of the gel body is maintained substantially constant during at least a part of the hydrothermal drying.

13. Method of claim 3 in which the article is optical fiber, in which the high-silica glass body constitutes an overcladding tube, and in which the method further comprises drawing a fiber from a fiber preform produced by collapsing of the tube so as to bring it into intimate contact with an enclosed core rod consisting of a core portion within an inner cladding portion, said core rod being produced by deposition using a process selected from the group consisting of Modified Chemical Vapor Deposition and a soot deposition process selected from the group consisting of Vapor Axial Deposition and Outside Vapor Deposition.

* * * * *